Patented Mar. 11, 1952

2,589,055

UNITED STATES PATENT OFFICE 2,589,055

MIXTURES COMPRISING POLYACRYLONITRILE AND POLYALKYL α-ACYLAMINOACRYLATES AND ARTICLES OBTAINED THEREFROM

Harry W. Coover, Jr., Kingsport, Tenn., and Joseph B. Dickey, Rochester, N. Y., assignors to Eastman Kodak Company, Rochester, N. Y., a corporation of New Jersey No Drawing. Application April 29, 1950, Serial No. 159,145

19 Claims. (Cl. 260—32.6)

This invention relates to polymer compositions comprising polyacrylonitrile and polyalkyl α-acylaminoacrylates and to articles obtained therefrom.

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in certain instances due to a substantial lowering of the softening point of the fiber. For example, while an interpolymer of acrylonitrile and acrylic acid containing about 80 per cent by weight of acrylonitrile and 20 per cent by weight of acrylic acid in the polymer molecule, can be drawn into fibers readily susceptible to dyes, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 per cent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homogeneous condition of the spinning solution and the fact that it is generally known that polyacrylonitrile is not compatible with many organic substances.

We have now made the unusual and valuable discovery that certain mixtures of polyacrylonitrile form stable solutions which do not separate into distinct layers on standing, and from which fibers of homogeneous character can be spun. These fibers are characterized by a softening point higher than the interpolymers referred to above, and do not exhibit the segmentation defect shown by many of the fibers prepared from certain prior art mixtures comprising polyacrylonitrile.

It is, therefore, an object of our invention to provide polymer mixtures comprising polyacrylonitrile.

A further object is to provide homogeneous solutions of these polymer mixtures comprising polyacrylonitrile.

Still another object is to provide fibers obtained from these homogeneous solutions of these polymer mixtures. Other objects will become apparent from a consideration of the following description and examples.

According to our invention, we provide polymer mixtures comprising from 60 to 90 per cent by weight of polyacrylonitrile and from 40 to 10 per cent by weight of a polyalkyl α-acylaminoacrylate. Quite unexpectedly, we have found that polymeric compositions having the above range of components are excellently adaptable for the spinning of fibers in that they have a high softening point, and provide synthetic yarns showing no perceptible segmentation.

The polymer mixtures of our invention comprising polyacrylonitrile and a polyalkyl α-acylaminoacrylate can be dissolved in solvents, such as N,N-dimethylformamide or N,N-dimethylacetamide, to form stable solutions which do not show any tendency to separate. The lack of graininess in these solutions permits smooth, trouble-free extrusion through jets in the spinning of fibers, and permits storage of these solutions for any length of time prior to spinning, without troublesome separation of the solution into two distinct layers. Especially useful compositions comprise those containing from 70 to 85 per cent by weight of polyacrylonitrile and from 30 to 15 per cent by weight of polyalkyl α-acylaminoacrylate. These compositions provide fibers which can be deeply dyed with acetate, direct, and acid-wool dyes.

The alkyl α-acylaminoacrylates whose polymers can be employed in our invention can advantageously be represented by the following general formula:

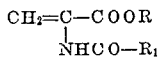

wherein R represents an alkyl group, such as methyl, ethyl, n-propyl, isopropyl, n-butyl, isobutyl, etc. groups (e. g. an alkyl group containing from 1 to 4 carbon atoms), and $R_1$ represents an alkyl group, such as methyl, ethyl, n-propyl, isopropyl, etc. groups (e. g. an alkyl group containing from 1 to 3 carbon atoms). Representative esters include, for example, methyl α-acetaminoacrylate, ethyl α-acetaminoacrylate, n-propyl α-acetaminoacrylate, isopropyl α-acetaminoacrylate, n-butyl α-acetaminoacrylate, methyl α-propionaminoacrylate, ethyl α-propionaminoacrylate, n-butyl α-propionaminoacrylate, methyl α-n-butyraminoacrylate, ethyl α-n-butyraminoacrylate, isobutyl α-n-butyraminoacrylate, methyl α-isobutyraminoacrylate, ethyl α-isobutyraminoacrylate, n-propyl α-isobutyraminoacrylate, isobutyl α-isobutyraminoacrylate, etc.

The alkyl α-acylaminoacrylates represented by the above general formula can be prepared according to the general method described in the copending application Serial No. 87,356, filed April 13, 1949, now U. S. Patent 2,548,518, issued April 10, 1951, of H. W. Coover, Jr., and Joseph B. Dickey. The process described in that application comprises reacting an alkali metal salt of an α-acylaminoacrylic acid with a dialkyl sulfate. The alkali metals useful for this purpose comprise those set forth in Serial No. 87,356 and also the alkali metal salts of the α-acylaminoacrylic acids described in the copending application Serial No. 132,216, filed December 9, 1949, of H. W. Coover, Jr., and Joseph B. Dickey.

The alkyl esters of the α-acylaminoacrylic acids represented by the above general formula can be polymerized according to the method described in U. S. Patent 2,461,383, dated February 8, 1949.

The polyacrylonitrile and polyalkyl α-acylaminoacrylate resins can be mixed together by any of several methods. The two ingredients can be mixed together in a suitable mixer, such as a ball mill or Banbury mixer, or they can be dissolved in a mutual solvent (which is known to dissolve polyacrylonitrile), such as N,N-dimethylformamide, N,N-dimethylacetamide, ethylene carbonate, ethylene carbamate, N-methyl-2-pyrrolidone, γ-butyrolactone, etc. The ingredients can be mixed together before addition to the solvent, or each ingredient can be added separately to the solvent. Again, the ingredients can be added to the solvent to produce a slurry or dispersion which is agitated and heated to effect solution. The solubility of the resins in the solvents can be improved by incorporating a small amount of certain acids, such as sulfuric acid, phosphoric acid, oxalic acid, etc. as has been described in U. S. Patents 2,503,244 and 2,503,245, both issued April 11, 1950, of H. W. Coover, T. E. Stanin, and J. B. Dickey. The concentration of solids in the solvents can be varied depending on the use to which the composition is to be put; however, for most purposes it has been found that from about 10 to 40 per cent by weight of solids is adequate.

The following examples illustrate methods for utilizing the new compositions of our invention.

*Example 1*

18 g. of a mixture containing 30 per cent by weight of polymethyl α-acetaminoacrylate and 70 per cent by weight of polyacrylonitrile were dissolved in 82 g. of N,N-dimethylformamide, and the solution was filtered under pressure into a stainless steel chamber, which had a single-hole spinneret measuring 0.1 mm. in diameter, extending horizontally from the bottom of the chamber in such a manner that upon extrusion, the filament would emerge at right angles to the chamber. The chamber was then closed, and the top thereof which was connected to a source of nitrogen gas opened to this gas supply, while a pressure of about 25 pounds per square inch was applied. Upon application of this pressure, the solution was extruded into a shallow bath 6 feet in length, which was placed at a right angle to the chamber, and contained water. The filament coagulated upon coming into contact with the water and was then taken up on a roller having a peripheral speed of 16 feet per minute. The filament was passed from this roller through a hot-air chamber heated at 170°–200° C. and onto a wind-up drum one meter in circumference, which was rotating at a surface speed of about 59 feet per minute. After the drum had made 50 revolutions an automatically controlled guide was shifted one inch to an adjacent position on the drum, and the drum was allowed to make another 50 revolutions. This was continued until several such 50-filament bundles were obtained. These were cut from the drum and the bundles containing 50 filaments, each measuring one meter in length, were separately twisted to obtain several one meter lengths of yarn. The samples thus produced had a tenacity of 2.4 grams per denier, an extensibility of 23 per cent, and shrank only 14 per cent in boiling water. The fibers showed no tendency to stick to a hot bar at temperatures as high as 200° C., and they had an excellent dye affinity for acetate, direct and acid-wool dyes.

*Example 2*

In a manner similar to that described in Example 1 above, a N,N-dimethylformamide solution of a mixture containing 25 per cent by weight of polymethyl α-propionaminoacrylate and 75 per cent by weight of polyacrylonitrile was spun into fibers one meter in length. They had a tenacity of 3.0 grams per denier, an extensibility of 15 per cent, a sticking (or softening) temperature of 190° C., and shrank only 12 per cent in boiling water. They had an excellent affinity for dyes and a high moisture regain.

*Example 3*

In a manner similar to that described in Example 1 above, a N,N-dimethylformamide solution of a mixture containing 20 per cent by weight of polyethyl α-acetaminoacrylate and 80 per cent by weight of polyacrylonitrile was spun into fibers one meter in length. They had a tenacity of 3.8 grams per denier, an extensibility of 20 percent, a sticking temperature above 200° C., and shrank only 10 per cent in boiling water.

*Example 4*

In a manner similar to that described in Example 1 above, a N,N-dimethylformamide solution of a mixture containing 40 per cent by weight of polymethyl α-acetaminoacrylate and 60 per cent by weight of polyacrylonitrile was spun into fibers one meter in length. They had a tenacity of 3.4 grams per denier, an extensibility of 21 per cent, a sticking temperature above 200° C., and shrank 14 per cent in boiling water. These fibers had an excellent affinity for acetate, direct, and acid-wool dyes.

*Example 5*

In a manner similar to that described in Example 1 above, a N,N-dimethylformamide solution of a mixture containing 10 per cent by weight of poly-n-butyl α-acetaminoacrylate and 90 per cent by weight of polyacrylonitrile was spun into fibers one meter in length. They had a tenacity of 3.0 grams per denier, an extensibility of 20 per cent, a sticking temperature above 200° C., and shrank only 11 per cent in boiling water. They had an excellent dye affinity for acetate, direct, acid-wool dyes.

*Example 6*

In a manner similar to that described in Example 1 above, a N,N-dimethylformamide solution of a mixture containing 10 per cent by weight of polyethyl α-acetaminoacrylate and 90 per cent by weight of polyacrylonitrile was spun into fibers one meter in length. They had a tenacity of 3.9 grams per denier, an extensibility of 22 per cent, and a sticking temperature above 200° C. They shank only 10 per cent in boiling water, and showed an affinity for acetate, direct, and acid-wool dyes.

Solvents other than N,N-dimethylformamide can advantageously be used in the preparation of the synthetic fibers and yarns of our invention, including those solvents which have been listed above.

Instead of using the homopolymer of acrylonitrile or the alkyl α-acylaminoacrylate, interpolymers of these monomers containing a predominating amount of the acrylonitrile or alkyl α-acylaminoacrylate can be used, if desired. The polymer described above and those set forth in the following claims are to be understood as including not only the homopolymers of the individual monomers, but also interpolymers of these particular monomers which contain a predominating amount of the acrylonitrile or the alkyl α-acylaminoacrylate. Such interpolymers should generally not contain more than about 5 per cent of another vinyl monomer, since amounts greater than this figure cause alteration in the properties of the interpolymers, giving products which differ substantially from the properties of the individual homopolymers. Interpolymers containing not more than about 5 per cent of different, modifying vinyl monomers have properties which are quite similar to those of the individual homopolymers. For the purpose of our invention, the simple homopolymers of acrylonitrile or the alkyl α-acylamino acrylate have been found to be the most useful by far. Interpolymers of acrylonitrile containing about 5 per cent of some modifier, such as vinyl acetate, vinyl formate, methyl acrylate, styrene, isopropenyl acetate, methyl α-methacrylate, acrylamide, and alkyl α-acylaminoacrylate, etc. can be used. Interpolymers of the alkyl α-acylaminoacrylates containing not more than about 5 per cent of another monomer, such as acrylonitrile, styrene, methyl α-methacrylate, etc. can also be used.

In the preparation of the polymer mixtures of our invention, an amount of the polyalkyl α-acylaminoacrylates less than about 10 per cent by weight, based on the total weight of the mixture of polyacrylonitrile and the polyalkyl α-acylaminoacrylate, should not be used, since amounts lower than this figure provide mixtures from which fibers not sufficiently susceptible to dyeing are obtained. On the other hand, mixtures containing more than about 40 per cent by weight of the polyalkyl α-acylaminoacrylate provide fibers which lose too high a percentage of the polyalkyl α-acylaminoacrylate in washing, and which are too sticky or tacky for practical purposes. Both of these defects are avoided in the compositions of our invention described herein, and those set forth in the claims appended hereto.

The polyacrylonitrile useful in practicing our invention can be prepared according to the process described in U. S. Patent 2,434,054, dated January 6, 1948, or U. S. Patent 2,296,403, dated September 22, 1942. Other processes which can be used are described in the copending applications, Serial No. 49,651, Serial No. 49,652, and Serial No. 49,653, all filed September 16, 1948, of T. E. Stanin, H. W. Coover, Jr., and J. B. Dickey.

The polyacrylonitrile and polyalkyl α-acylaminoacrylate mixtures of our invention are also useful in the preparation of sheets, films, tapes, etc.

What we claim as our invention and desire secured by Letters Patent of the United States is:

1. A resinous composition comprising from 60 to 90 per cent by weight of a polymer containing at least 95 per cent by weight of acrylonitrile in the polymer molecule, and from 40 to 10 per cent by weight of a polymer containing in the polymer molecule at least 95 per cent by weight of an alkyl α-acylaminoacrylate represented by the following general formula:

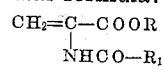

wherein R represents an alkyl group of the formula $C_nH_{2n+1}$, wherein $n$ represents a positive integer of from 1 to 4, and $R_1$ represents an alkyl group of the formula $C_mH_{2m+1}$, wherein $m$ represents a positive integer of from 1 to 3.

2. A resinous composition comprising from 60 to 90 per cent by weight of a homopolymer of acrylonitrile and from 40 to 10 per cent by weight of a homopolymer of an alkyl α-acylaminoacrylate represented by the following general formula:

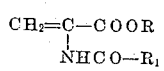

wherein R represents an alkyl group of the formula $C_nH_{2n+1}$, wherein $n$ represents a positive integer of from 1 to 4 and $R_1$ represents an alkyl group of the formula $C_mH_{2m+1}$, wherein $m$ represents a positive integer of from 1 to 3.

3. A resinous composition comprising from 70 to 85 per cent by weight of a homopolymer of acrylonitrile and from 30 to 15 per cent by weight of a homopolymer of an alkyl α-acylaminoacrylate represented by the following general formula:

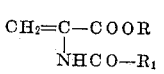

wherein R represents an alkyl group of the formula $C_nH_{2n+1}$, wherein $n$ represents a positive integer of from 1 to 4 and $R_1$ represents an alkyl group of the formula $C_mH_{2m+1}$, wherein $m$ represents a positive integer of from 1 to 3.

4. A resinous composition comprising from 60 to 90 per cent by weight of a homopolymer of acrylonitrile and from 40 to 10 per cent by weight of a homopolymer of methyl α-acetaminoacrylate.

5. A resinous composition comprising from 60 to 90 per cent by weight of a homopolymer of acrylonitrile and from 40 to 10 per cent by weight of a homopolymer of ethyl α-acetaminoacrylate.

6. A resinous composition comprising from 60 to 90 per cent by weight of a homopolymer of acrylonitrile and from 40 to 10 per cent by weight of a homopolymer of methyl α-propionaminoacrylate.

7. A resinous composition comprising from 60 to 90 per cent by weight of a homopolymer of acrylonitrile and from 40 to 10 per cent by weight of a homopolymer of n-butyl α-acetaminoacrylate.

8. A solution of a resinous composition comprising from 60 to 90 per cent by weight of a polymer containing at least 95 per cent by weight of acrylonitrile in the polymer molecule, and from 40 to 10 per cent by weight of a polymer containing in the polymer molecule at least 95 per cent by weight of an alkyl α-acylaminoacrylate represented by the following general formula:

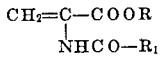

wherein R represents an alkyl group of the formula $C_nH_{2n+1}$, wherein $n$ represents a positive integer of from 1 to 4 and $R_1$ represents an alkyl group of the formula $C_mH_{2m+1}$, wherein $m$ represents a positive integer of from 1 to 3, in a solvent selected from the group consisting of N,N-dimethylformamide, N,N-dimethylacetamide, ethylene carbonate, ethylene carbamate, N-methyl-2-pyrrolidone, and γ-butyrolactone.

9. A solution of a resinous composition comprising from 60 to 90 per cent by weight of a homopolymer of acrylonitrile and from 40 to 10 per cent by weight of a homopolymer of an alkyl α-acylaminoacrylate represented by the following general formula:

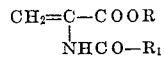

wherein R represents an alkyl group of the formula $C_nH_{2n+1}$, wherein $n$ represents a positive integer of from 1 to 4 and $R_1$ represents an alkyl group of the formula $C_mH_{2m+1}$, wherein $m$ represents a positive integer of from 1 to 3, in N,N-dimethylformamide.

10. A solution of a resinous composition comprising from 70 to 85 per cent by weight of a homopolymer of acrylonitrile and from 30 to 15 per cent by weight of a homopolymer of an alkyl α-acylaminoacrylate represented by the following general formula:

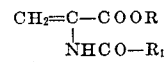

wherein R represents an alkyl group of the formula $C_nH_{2n+1}$, wherein $n$ represents a positive integer of from 1 to 4 and $R_1$ represents an alkyl group of the formula $C_mH_{2m+1}$, wherein $m$ represents a positive integer of from 1 to 3, in N,N-dimethylformamide.

11. A solution of a resinous composition comprising from 60 to 90 per cent by weight of a homopolymer of acrylonitrile and from 40 to 10 per cent by weight of a homopolymer of methyl α-acetaminoacrylate, in N,N-dimethylformamide.

12. A solution of a resinous composition comprising from 60 to 90 per cent by weight of a homopolymer of acrylonitrile and from 40 to 10 per cent by weight of a homopolymer of ethyl α-acetaminoacrylate, in N,N-dimethylformamide.

13. A solution of a resinous composition comprising from 60 to 90 per cent by weight of a homopolymer of acrylonitrile and from 40 to 10 per cent by weight of a homopolymer of methyl α-propionaminoacrylate, in N,N-dimethylformamide.

14. A solution of a resinous composition comprising from 60 to 90 per cent by weight of a homopolymer of acrylonitrile and from 40 to 10 per cent by weight of a homopolymer of n-butyl α-acetaminoacrylate, in N,N-dimethylformamide.

15. A resinous composition comprising from 70 to 85 per cent by weight of a homopolymer of acrylonitrile and from 30 to 15 per cent by weight of a homopolymer of methyl α-acetaminoacrylate.

16. A solution of a resinous composition comprising from 70 to 75 per cent by weight of a homopolymer of acrylonitrile and from 30 to 15 per cent by weight of a homopolymer of methyl α-acetaminoacrylate, in N,N-dimethylformamide.

17. A synthetic fiber comprising a resinous composition comprising from 60 to 90 per cent by weight of a polymer containing at least 95 per cent by weight of acrylonitrile in the polymer molecule, and from 40 to 10 per cent by weight of a polymer containing in the polymer molecule at least 95 per cent by weight of an alkyl α-acylaminoacrylate represented by the following general formula:

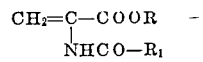

wherein R represents an alkyl group of the formula $C_nH_{2n+1}$, wherein $n$ represents a positive integer of from 1 to 4 and $R_1$ represents an alkyl group of the formula $C_mH_{2m+1}$, wherein $m$ represents a positive integer of from 1 to 3.

18. A synthetic fiber comprising a resinous composition comprising from 60 to 90 per cent by weight of a homopolymer of acrylonitrile and from 40 to 10 per cent by weight of a homopolymer of an alkyl α-acylaminoacrylate represented by the following general formula:

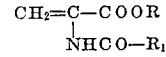

wherein R represents an alkyl group of the formula $C_nH_{2n+1}$, wherein $n$ represents a positive integer of from 1 to 4 and $R_1$ represents an alkyl group of the formula $C_mH_{2m+1}$, wherein $m$ represents a positive integer of from 1 to 3.

19. A synthetic fiber comprising a resinous composition comprising from 60 to 90 per cent by weight of a homopolymer of acrylonitrile and from 40 to 10 per cent by weight of a homopolymer of methyl α-acetaminoacrylate.

HARRY W. COOVER, JR.
JOSEPH B. DICKEY.

REFERENCES CITED

The following references are of record in the file of this patent:

UNITED STATES PATENTS

| Number | Name | Date |
| --- | --- | --- |
| 2,404,714 | Latham | July 23, 1946 |
| 2,527,863 | Webb | Oct. 31, 1950 |